US006683450B2

(12) United States Patent
Rick et al.

(10) Patent No.: US 6,683,450 B2
(45) Date of Patent: Jan. 27, 2004

(54) SENSOR ASSEMBLY WITH SPLICE BAND CONNECTION

(75) Inventors: Michael G. Rick, Janesville, WI (US); Gary P. Schneider, Janesville, WI (US); Kenneth McDonald, Bradenton, FL (US)

(73) Assignee: SSI Technologies, Inc., Janesville, WI (US)

( * ) Notice: Subject to any disclaimer, the term of this patent is extended or adjusted under 35 U.S.C. 154(b) by 8 days.

(21) Appl. No.: 10/001,555

(22) Filed: Oct. 31, 2001

(65) Prior Publication Data

US 2003/0080730 A1 May 1, 2003

(51) Int. Cl.[7] .................................................. G01P 3/48
(52) U.S. Cl. ............... 324/173; 324/207.2; 324/207.21; 174/84 C; 439/439
(58) Field of Search .................................. 324/173–174, 324/207.2–207.21, 207.25; 72/20.1, 21.3, 17.2; 439/439; 174/84 C–94 R

(56) References Cited

U.S. PATENT DOCUMENTS

| | | | | |
|---|---|---|---|---|
| 4,084,876 A | * | 4/1978 | Dinger | 339/95 |
| 4,435,659 A | * | 3/1984 | Peterson | 310/68 R |
| 4,646,042 A | * | 2/1987 | Eshelman | 335/205 |
| 5,394,081 A | * | 2/1995 | Ogawa et al. | 324/174 |
| 5,887,469 A | * | 3/1999 | Maeda et al. | 72/20.1 |

OTHER PUBLICATIONS

Autosplice brochure, 2 pages—See attached Statement of Relevance.
SSI drawing No. C–8886.2—See attached Statement of Relevance.
SSI drawing No. C–8348.2—see attached Statement of Relevance.

* cited by examiner

*Primary Examiner*—Walter E. Snow
*Assistant Examiner*—Subhash Zaveri
(74) *Attorney, Agent, or Firm*—Michael Best & Friedrich LLP

(57) ABSTRACT

An electronic sensor assembly that can be used in speed-sensing applications such as anti-lock brake systems. The sensor assembly includes a sensor element, a housing surrounding the sensor element, a sensor terminal connected to the sensor element and extending outside of the housing for electrically coupling the sensor element to a conductor, a connector terminal for mechanically and electrically coupling the sensor terminal to the conductor, and a splice band mechanically and electrically coupling the sensor terminal to the connector terminal without welding, soldering, or using a crimp bucket. In one aspect of the invention, the sensor assembly further includes a capacitor electrically and mechanically coupled to the sensor terminal and the connector terminal via the splice band. The sensor element is preferably an active sensor such as a magneto-resistive sensor or a Hall-Effect sensor.

23 Claims, 2 Drawing Sheets

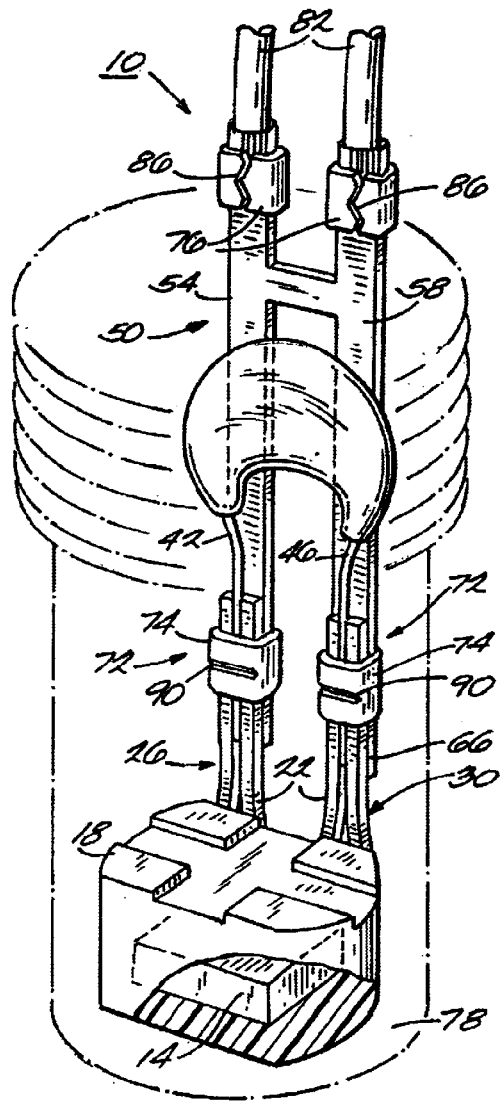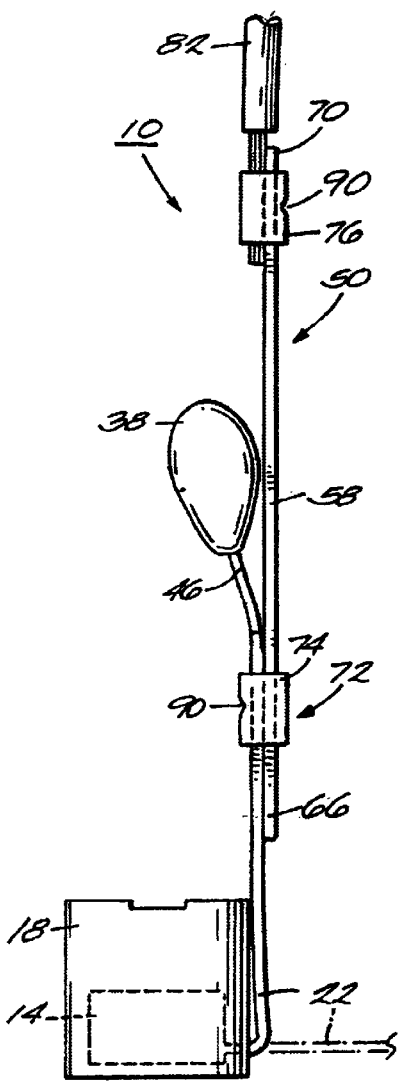

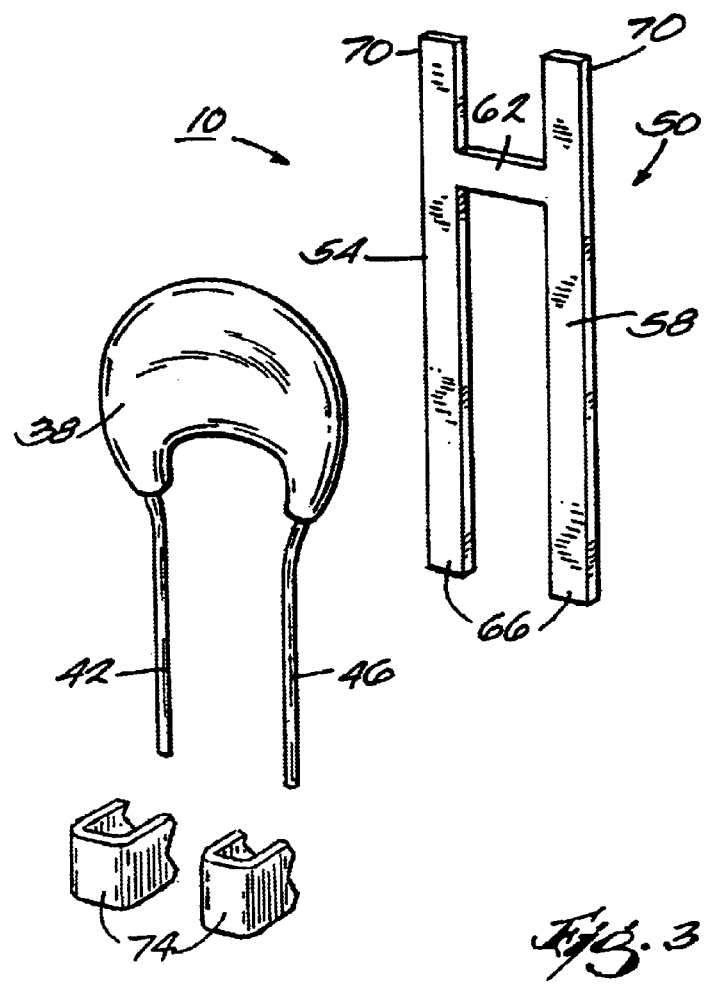
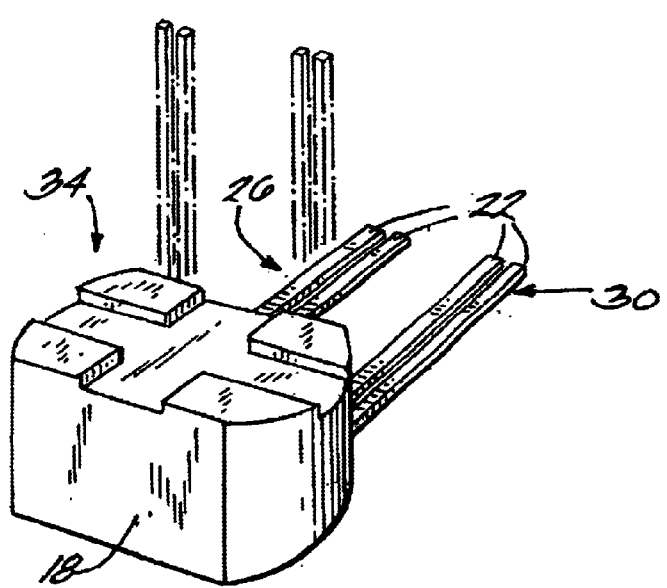
Fig. 3

US 6,683,450 B2

SENSOR ASSEMBLY WITH SPLICE BAND CONNECTION

FIELD OF THE INVENTION

The invention relates to sensor assemblies, and more particularly to speed-sensor assemblies.

BACKGROUND OF THE INVENTION

Sensor assemblies, and more particularly speed-sensor assemblies are commonly used in a wide range of applications ranging from automotive anti-lock brake and transmission systems to various automated manufacturing and conveyor lines. In an anti-lock brake system, for example, a speed-sensor assembly is positioned adjacent a wheel of a vehicle to monitor the speed at which the wheel is rotating. When the sensor assembly determines that the brakes have been applied to stop the rotation of the wheel, the anti-lock brake system engages to rapidly pulse the brakes and stop the vehicle in a controlled manner. The speed-sensor assemblies associated with anti-lock brake systems can be used in tire deflation detection systems that monitor the speed of wheel rotation to determine whether a tire on the wheel is likely to be deflated.

Sensor assemblies use sensing devices that can be characterized as either active or passive sensing devices. An active sensing device is one that requires a power source to function. A passive sensing device does not require power. One known form of an active speed-sensing device that is used in conjunction with anti-lock brake systems is a magneto-resistive sensing device. A magneto-resistive sensing device has a predetermined magnetic field associated therewith. When placed adjacent the teeth of a gear or other similar component of the wheel assembly, the magnetic field is interrupted by the passing of each gear tooth, thereby changing the resistance in the sensing device. As a current is passed through the sensing device, the changes in resistance associated with the changes in the magnetic field vary the current flow through the sensing device. By monitoring the current flow through the sensing device, it is possible to determine the speed at which the wheel is rotating.

Another type of active sensing device commonly used in anti-lock brake applications utilizes the Hall Effect. A Hall-Effect sensing device also has a predetermined magnetic field associated therewith and is also mounted adjacent a toothed gear. As the teeth pass by the sensing device, the magnetic field of the sensing device is interrupted. The variation in the magnetic field creates a variation in the voltage measured across the sensing device. The voltage can be monitored to determine the speed at which the wheel is rotating.

Regardless of the specific type used, the active sensing device is typically packaged in a sensor assembly that includes the sensor device itself and a connector terminal that can be coupled to a power supply. The sensor assembly also may include a capacitor that is coupled to both the sensing device and the connector terminal. As is commonly understood by those of skill in the art, the capacitor helps reduce electrical interference or noise that might otherwise diminish the effectiveness of the sensing device (some devices have self-contained conditioning circuits and do not require an additional capacitor). The components of the sensor assembly are welded, soldered, or crimped together to create the mechanical and electrical connections needed (crimping is accomplished with a pre-formed crimp bucket on the terminal connector). Heretofore, welding, soldering, and crimping with a crimp bucket have been the only means employed to effect these mechanical and electrical connections.

SUMMARY OF THE INVENTION

There are several potential failure modes and processing issues with the prior art sensor assemblies. The sensor assemblies described above, and particularly those used for automotive applications, are typically produced in large quantities. It is therefore desirable to assemble the sensor assemblies in an efficient, reliable, and cost-effective manner. It has been found that the commonly-practiced resistance welding, crimping, and soldering processes are not robust enough or have excessive tooling/component costs for creating the numerous electrical and mechanical connections required on each sensor assembly. Because the sensing components and terminals are small or have intricate geometry, welding, crimping, or soldering the sensor terminals and capacitor to the connector terminal is a very constrained, time-consuming, and difficult process. Each welded, crimped, or soldered connection must be produced individually. This can involve four or more welds, crimps, or solder joints in an extremely small area.

Multiple connections in a process often result in improperly-formed connections (more joints equals increased probability of failure). The weld characteristics are extremely position-sensitive, meaning that the quality of the connection will vary significantly depending upon the relative position of the components being welded. Air gaps between the welded terminals can degrade the quality of the welded connections, thereby affecting the reliability of the sensing device. Welding or soldering also exposes the sensing device and the sensing device housing to high localized heat that can damage or destroy the sensing device and the housing. Welding and soldering require on-going maintenance to keep the process running properly.

Crimping with a fixed crimp bucket can lead to stresses that can damage the sensing device. Improper crimps due to improper component alignment can create poor connections to the sensing device, which in turn, can create defective products.

These problems necessitate expensive quality control measures. Each welded or soldered connection must be visually inspected using an automated vision system to insure the quality of the connection. Terminals with crimp buckets must be precisely designed to create proper retention force. Terminals with crimp buckets must be monitored with crimp force monitors to assure the process is correct. Due in large part to these inadequate welding, soldering, and crimping operations, the volume of sensor assemblies that are rejected as being deficient in some respect is high compared to the volume of sensor assemblies produced.

Other design features are also complicated in light of the welding, crimping, and soldering processes. For example, the connector terminal to which the sensor terminals and the capacitor terminals are welded or soldered must be electroplated with tin or other conductive materials to improve the conductive bond. Electroplating each connector terminal adds cost to the sensor assembly. Additionally, the connector terminal must be enlarged and perhaps even specially configured to accommodate the welding or soldering. For use in a crimping application, the connector terminal must have adequate space between each lead to allow the crimp bucket to be formed during the stamping process. These requirements increase the size and cost of the entire sensor assembly.

The present invention recognizes these and other problems with the prior art sensor assemblies, and provides an improved sensor assembly and method for manufacturing the same. The sensor assembly of the present invention is formed without the troublesome welding, crimping, or soldering operations. Instead, splice bands are used to create multiple mechanical and electrical "splice connections" in a single junction in a quick and reliable manner. As a result, the number of connection points required is reduced and thus the number of deficient and defective sensor assemblies is reduced. The cost of assembly, terminal tooling, and quality control testing is also reduced. Furthermore, the design and manufacture of the connector terminal is greatly simplified, and the overall size of the sensor assembly can potentially be reduced.

The spliced connections are preferably in the form of separate, free-floating splice bands that are cut from a strip of conductive material, formed into U-shaped forms, placed over the various terminals to be coupled, pressed closed to surround the terminals, and then crimped to secure the bands in place. These splice bands are well-suited for the tight space constraints associated with the sensor assembly and can be easily adjusted for changes in part geometry. Compared to a terminal with a crimp bucket that requires a unique terminal for each part design, the spliced joint is completely flexible and more cost effective.

The present invention encompasses sensor assemblies incorporating various types of active sensing devices, including, but not limited to, magneto-resistive sensing devices and Hall-Effect sensing devices. Sensor assemblies incorporating passive sensing devices are also contemplated.

More specifically, the invention provides an electronic sensor assembly that can be used in various speed-sensing applications such as anti-lock brake systems. The sensor assembly includes a sensor element, a housing surrounding the sensor element, a terminal connected to the sensor element that extends outside of the housing for electrically coupling the sensor element to a conductor, a connector terminal for mechanically and electrically coupling the sensor terminal to the conductor, and a splice band mechanically and electrically coupling the sensor terminal to the connector terminal without welding, soldering, or using a crimp bucket. In one aspect of the invention, the sensor assembly further includes a capacitor electrically and mechanically coupled to the sensor terminal and the connector terminal via the splice band. The sensor element is preferably an active sensor such as a magneto-resistive sensor or a Hall-Effect sensor.

The invention also provides a method of assembling a sensor assembly having a sensor with at least two sensor terminals and a connector terminal having first and second legs. The method includes aligning a first sensor terminal and the first leg of the connector terminal, and splice-connecting the first sensor terminal and the first leg of the connector terminal to create a mechanical and electrical connection without welding, soldering, or using a crimp bucket. The method further includes aligning a second sensor terminal and the second leg of the connector terminal, and splice-connecting the second sensor terminal and the second leg of the connector terminal to create a mechanical and electrical connection without welding, soldering, or using a crimp bucket.

In one aspect of the invention, the sensor assembly further includes a capacitor having first and second capacitor terminals. The method further includes aligning the first capacitor terminal with the first sensor terminal and the first leg of the connector terminal, splice-connecting the first capacitor terminal with the first sensor terminal and the first leg of the connector terminal, aligning the second capacitor terminal with the second sensor terminal and the second leg of the connector terminal, and splice-connecting the second capacitor terminal with the second sensor terminal and the second leg of the connector terminal.

Other features and advantages of the invention will become apparent to those skilled in the art upon review of the following detailed description, claims, and drawings.

BRIEF DESCRIPTION OF THE DRAWINGS

FIG. 1 is a perspective view of a sensor assembly embodying the invention.

FIG. 2 is a side view of the sensor assembly of FIG. 1.

FIG. 3 is an exploded view of the components of the sensor assembly shown in FIGS. 1 and 2.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

FIGS. 1–3 illustrate an electronic sensor assembly or package 10 embodying the invention. The sensor assembly 10 is used in applications that require speed-monitoring, and more specifically, the sensor assembly 10 is well-suited for use with anti-lock brake systems as described above. Of course, the sensor assembly 10 could be used for other speed-monitoring applications, such as various molding, manufacturing, or assembly applications. Alternatively, the sensor assembly 10 could be a sensor used in direction detection applications, speed and direction detection applications, and position sensing applications.

The sensor assembly 10 includes an integrated circuit sensor element 14 (shown schematically in FIGS. 1 and 2) surrounded by a housing 18. The sensor element 14 can be an active sensor of any construction, including, but not limited to, a magneto-resistive sensor or a Hall-Effect sensor as described above. Passive sensor elements can also be used. Sensor terminals 22 are connected to the sensor element 14 and extend from the housing 18. The sensor terminals 22 are formed from a solid conductive material to provide an electrical connection to the sensing element 14 as will be described in greater detail below. The illustrated sensor assembly 10 includes a first pair 26 and a second pair 30 of sensor terminals 22. Of course, the number and configuration of sensor terminals 22 can vary. For example, the sensor assembly 10 could simply have two spaced-apart sensor terminals instead of two pairs of spaced apart sensor terminals 26 and 30 as shown.

Together, the sensor element 14, the housing 18, and the sensor terminals 22 comprise an assembled sensor unit 34 (see FIG. 3) that can be purchased from a variety of independent suppliers. For example, the sensor unit 34 illustrated in the figures can be purchased from Allegro Microsystems Inc. of Worcester, Mass.

The sensor assembly 10 also preferably includes a capacitor 38 that is recommended for reducing electrical interference or noise that may inhibit the effectiveness of the sensor element 14. The capacitor 38 includes first and second capacitor terminals 42 and 46, respectively. The capacitor 38 can be chosen to suit the specific needs of the particular application. Of course, if noise is not an issue or the system is not noise-sensitive, the capacitor 38 can be eliminated.

The sensor assembly 10 further includes a connector terminal 50 that provides a mechanical and electrical connection to the sensing element 14 as will be described in greater detail below. The connector terminal 50 is preferably stamped from a brass compound and includes first and second legs 54 and 58 that are originally connected together via a cross member 62 (shown in FIG. 3). The cross member 62 is later removed as will be described below. Each of the legs 54 and 58 is substantially rectangular in cross-section and includes a lower end 66 and an upper end 70 (see FIG. 3). The terms "upper" and "lower" are used for purposes of description only and are not meant to imply any specific location or orientation. In the illustrated embodiment, the lower ends 66 are spaced from one another by approximately two to three millimeters. The legs 54 and 58 are illustrated as being substantially parallel to one another, however, the legs 54 and 58 could also be formed such that the upper ends 70 are spaced slightly further apart from one another than the lower ends 66. The length of the legs 54 and 58 can be adjusted by shearing the legs 54 and 58 to the desired lengths.

The illustrated connector terminal 50 is substantially planar, making the connector terminal 50 easy and inexpensive to manufacture. Of course, the terminal connector 50 need not be a stamped, substantially planar part, but could have other non-planar configurations formed using different forming techniques. Additionally, the cross member 62 could be eliminated. Of course, if the cross member 62 were eliminated, the connector terminal 50 would always be two separate pieces: the first leg 54 and the second leg 58. Other suitable conductive materials can also be used. As will be discussed below, the connector terminal 50 need not be electroplated or otherwise coated for welding as is the case with prior art connector terminals.

The sensor unit 34, the capacitor 38, and the connector terminal 50 are mechanically and electrically coupled together via splice-connections 72 that are created using conductive, U-shaped splice bands 74. The splice bands 74 enable the splice-connections 72 to be made without any welding, fixed crimp buckets, or soldering of the components, as is typical with prior art sensor assemblies. The splice bands 74 can be manually or automatically secured to couple the components in the manner shown. While the splice bands 74 are shown as being positioned at substantially the same vertical level in FIGS. 1 and 2, it is to be understood that the vertical positioning of the splice bands 74 can be staggered if desired. Such vertical staggering may be desirable where the distance between the lower ends 66 of the legs 54 and 58 makes the application of the splice bands 74 somewhat cumbersome.

The splice bands 74 and the basic tools and/or machines (not shown) needed to make the splice-connections 72 are available from Autosplice Inc. of San Diego, Calif. Preferably, the splice bands 74 are individually cut from a roll of conductive material and then formed into the U-shaped form shown in FIG. 3. This U-shaped form makes the splice band 74 well-suited for application to the confined area adjacent the lower ends 66 of the legs 54 and 58. The method of forming the splice-connections 72 will be explained in detail below.

As seen in FIG. 1, the assembled sensor assembly 10 is surrounded by a protective overmolding 78 (shown in phantom). The overmolding 78 is preferably made from a non-conductive plastic material that is molded around the sensor assembly 10. The overmolding 78 helps protect and electrically isolate the sensor assembly 10 from the environment, thereby substantially eliminating any leak paths that may impede the operation and accuracy of the sensor element 14. The particular size and shape of the overmolding 78 can be varied to fit the particular envelope provided for each application. Alternatively, the overmolding 78 can be kept consistent as a generic overmolding that can later be overmolded again to fit the envelope provided for a specific application.

The upper ends 70 of the legs 54 and 58 extend from the overmolding 78 to facilitate electrical connection to a power source (not shown). The power source provides the electrical power needed for the operation of the sensor element 14. As seen in FIGS. 1 and 2, each upper end 70 is coupled to a conductor 82 that is coupled to the power source. The connection between the upper ends 70 and the conductor wires 82 is preferably achieved using additional splice bands 76. It should be noted, however, that the connection between the upper ends 70 and the conductor wires 82 can be formed via other suitable techniques, such as welding, soldering, or crimp buckets, because there is sufficient space in which to perform such connecting techniques and because each junction consists of only two components (the upper end 70 and the conductor wires 82).

The method of assembling the sensor assembly 10 will now be described. In no particular order, the components are positioned such that the first pair 26 of sensor terminals 22, the first capacitor terminal 42, and the lower end 66 of the first leg 54 are aligned in substantially parallel relation as shown in FIG. 1. Preferably, the first capacitor terminal 42 is positioned between the first pair 26 of sensor terminals 22 as shown in FIG. 1, but this is not critical. It is also possible to position the capacitor 38 on the opposite side of the connector terminal 50 if desired. The second pair 30 of sensor terminals 22, the second capacitor terminal 46, and the lower end 66 of the second leg 58 are also aligned as shown. Of course, the capacitor 38 should be eliminated if not required for the particular application. Furthermore, if the sensor assembly 10 were to only include two spaced-apart sensor terminals, one of the spaced-apart sensor terminals would be aligned with each leg 54, 58 of the connector terminal 50.

Next, the U-shaped splice bands 74 are positioned over the respective junction points defined by the location of the first and second pairs 26, 30 of sensor terminals 22. The U-shaped splice bands 74 are then closed tightly around the legs 54 and 58 either manually or using automated equipment. Closing the splice bands 74 can be completed sequentially, or at the same time, depending on the method used. A seam 86 (shown only on the splice band 76 in FIG. 1) is formed when each splice band 74 is closed. The seams 86 created by closing the splice-bands 74 are preferably adjacent the side of the legs 54 and 58 that is opposite to the sensor terminals 22 and the capacitor terminals 42 and 46, however, the seams 86 could be adjacent one or both of the sensor terminals 22 and the capacitor terminals 42 and 46 if desired.

The splice-bands 74 are then crimped, either manually or automatically, to secure the mechanical and electrical connection and to substantially prevent movement of the splice bands 74 relative to the respective arms 54 and 58, sensor terminals 22, and capacitor terminals 42 and 46. The crimping deforms the splice bands 74 in a plane normal to the aligned components to effectively pinch a portion of the splice bands 74 even tighter. An indentation 90 is formed in each splice band 74 as a result of the crimping. While it is preferred that the crimping occurs on the non-seam side of the splice bands 74, the crimp can also be made to the seam side if desired. Furthermore, it may be possible to eliminate the crimping step altogether. Because the splice bands 74 are made from a conductive material, each splice-connection 72 electrically couples each of the mechanically coupled components. No welding or soldering is required. However, welding or soldering could be included in the process to provide redundancy in the connection.

With the splice bands 74 crimped and secured to the respective legs 54 and 58, the cross member 62 can be removed either manually or automatically to electrically isolate the legs 54 and 58 from one another. Finally, the sensor assembly 10 can be overmolded with the overmolding 78 and the upper ends 70 can be coupled to the conductor wires 82 with the splice bands 76 or with any of the other techniques described above.

At some point prior to or during assembly, the sensor terminals 22 can be bent from their original position (shown in solid lines in FIG. 3) to the position shown in FIGS. 1 and 2 (also shown in phantom in FIG. 3). It should be noted that the bending of the sensor terminals 22 can occur at any time prior to or during assembly, but should occur prior to overmolding the sensor assembly 10 to arrive at the configuration shown in FIG. 1. Of course, the sensor terminals 22 need not be bent at all, and could be overmolded in their original position if so desired.

The sensor assembly 10 and the method for assembling the sensor assembly described above provides significant improvements over the prior art. Specifically, the splice bands 74 connect the various components mechanically and electrically without any welding or soldering. Until now, welding, crimping, and soldering have been the only methods accepted for creating connections on this type of sensor assembly. The splice-connections 72 provide a much more efficient, cost-effective, and reliable way to form the multiple mechanical and electrical connections on the sensor assembly 10. Additionally, the configuration of the splice bands 74 is well-suited for use in the confined junction areas.

The design of the connector terminal 50 is also improved in light of the present invention. By eliminating the need for delicate welding and soldering operations, the size of the connector terminal 50 can be reduced, thereby reducing the overall size of the entire sensor assembly 10. Additionally, the substantially planar design of the connector terminal 50 permits more cost-effective manufacturing and assembly techniques. Furthermore, the expensive electroplating process, usually needed for welding or soldering, is eliminated. The splice-connection 72 also eliminates the need for dedicated crimp buckets formed on the terminal.

Various features of the invention are set forth in the following claims.

What is claimed is:

1. An electronic sensor assembly comprising:
    a sensor element;
    a housing surrounding the sensor element;
    a sensor terminal electrically connected to the sensor element and extending outside of the housing for electrically coupling the sensor element to a conductor;
    a connector terminal for mechanically and electrically coupling the sensor terminal to the conductor; and
    a splice band mechanically and electrically coupling the sensor terminal to the connector terminal without welding, soldering, or using crimp buckets.

2. The electronic sensor assembly of claim 1, further comprising:
    a capacitor mechanically and electrically coupled to the sensor terminal and the connector terminal via the splice band.

3. The electronic sensor assembly of claim 1, wherein the sensor element is a magneto-resistive sensor.

4. The electronic sensor assembly of claim 1, wherein the sensor element is a Hall-Effect sensor.

5. The electronic sensor assembly of claim 1, wherein the splice band is substantially U-shaped prior to being assembled on the sensor assembly.

6. The electronic sensor assembly of claim 1, wherein the sensor terminal and the connector terminal are formed from a solid conductive material.

7. An electronic sensor assembly comprising:
    a sensor element;
    a housing surrounding the sensor element;
    at least two spaced-apart sensor terminals coupled to the sensor element and extending outside of the housing for electrically coupling the sensor element to a conductor;
    a connector terminal for mechanically and electrically coupling the sensor terminals to the conductor, the connector terminal including first and second legs;
    a first splice band mechanically and electrically coupling a first of the sensor terminals to the first leg of the connector terminal without welding, soldering, or using crimp buckets; and
    a second splice band mechanically and electrically coupling a second of the sensor terminals to the second leg of the connector terminal without welding, soldering, or using crimp buckets.

8. The sensor assembly of claim 7, further comprising:
    a capacitor having first and second capacitor terminals, the first capacitor terminal being mechanically and electrically coupled to the first leg of the connector terminal and the first sensor terminal via the first splice band, and the second capacitor terminal being mechanically and electrically coupled to the second leg of the connector terminal and the second sensor terminal via the second splice band.

9. The sensor assembly of claim 7, wherein the sensor element is a magneto-resistive sensor.

10. The sensor assembly of claim 7, wherein the sensor element is a Hall-Effect sensor.

11. The electronic sensor assembly of claim 7, wherein the splice band is substantially U-shaped prior to being assembled on the sensor assembly.

12. The electronic sensor assembly of claim 7, wherein the first and second legs of the connector terminal are spaced apart at a distance of approximately 2 to 3 mm.

13. The electronic sensor assembly of claim 7, wherein the connector terminal is substantially planar.

14. The electronic sensor assembly of claim 7, wherein the first and second legs of the connector terminal are substantially rectangular in cross-section.

15. A method of assembling a sensor assembly having a sensor with at least two sensor terminals and a connector terminal having first and second legs, the method comprising:
    aligning a first sensor terminal and the first leg of the connector terminal;

splice-connecting the first sensor terminal and the first leg of the connector terminal to create a mechanical and electrical connection without welding, soldering, or using crimp buckets;

aligning a second sensor terminal and the second leg of the connector terminal; and splice-connecting the second sensor terminal and the second leg of the connector terminal to create a mechanical and electrical connection without welding, soldering, or using crimp buckets.

16. The method of claim 15, wherein the sensor assembly further includes a capacitor having first and second capacitor terminals, the method further comprising:

aligning the first capacitor terminal with the first sensor terminal and the first leg of the connector terminal;

splice-connecting the first capacitor terminal with the first sensor terminal and the first leg of the connector terminal;

aligning the second capacitor terminal with the second sensor terminal and the second leg of the connector terminal; and splice-connecting the second capacitor terminal with the second sensor terminal and the second leg of the connector terminal.

17. The method of claim 15, wherein the aligning and the splice-connecting is automated.

18. The method of claim 15, further comprising:

removing a cross-member connected between the first and second legs to electrically and mechanically isolate the first and second legs from one another.

19. The method of claim 15, wherein the sensor is surrounded by a housing and the sensor terminals extend outside of the housing, the method further comprising:

bending the sensor terminals with respect to the housing.

20. The method of claim 15, further comprising:

overmolding at least a portion of the assembled sensor assembly.

21. The method of claim 15, wherein splice-connecting the first sensor terminal and the first leg of the connector terminal includes closing a first U-shaped splice band around the first sensor terminal and the first leg of the connector terminal, and wherein splice-connecting the second sensor terminal and the second leg of the connector terminal includes closing a second U-shaped splice band around the second sensor terminal and the second leg of the connector terminal.

22. The method of claim 21, wherein splice-connecting the first sensor terminal and the first leg of the connector terminal further includes crimping the closed first splice band, and wherein splice-connecting the second sensor terminal and the second leg of the connector terminal further includes crimping the closed second splice band.

23. The method of claim 15, further comprising:

splice-connecting a first conductor wire to a first leg of the connector terminal; and splice-connecting a second conductor wire to a second leg of the connector terminal.

* * * * *